United States Patent
Burkhard

(10) Patent No.: US 9,612,149 B2
(45) Date of Patent: Apr. 4, 2017

(54) WEIGHING CELL WITH A DEVICE FOR CORRECTING ECCENTRIC LOADING ERRORS AND A METHOD FOR CORRECTING ECCENTRIC LOADING ERRORS

(71) Applicant: Mettler-Toledo AG, Greifensee (CH)

(72) Inventor: Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 196 days.

(21) Appl. No.: 14/511,384

(22) Filed: Oct. 10, 2014

(65) Prior Publication Data

US 2015/0101869 A1    Apr. 16, 2015

(30) Foreign Application Priority Data

Oct. 10, 2013   (EP) .................................. 13188141

(51) Int. Cl.
*G01G 19/414*    (2006.01)
*G01G 23/01*    (2006.01)

(52) U.S. Cl.
CPC ......... *G01G 19/414* (2013.01); *G01G 23/012* (2013.01)

(58) Field of Classification Search
CPC .. G01G 3/1412; G01G 3/1414; G01G 19/414; G01G 21/244; G01G 23/01; G01G 23/012
See application file for complete search history.

(56) References Cited

U.S. PATENT DOCUMENTS

| | | | | |
|---|---|---|---|---|
| 4,766,965 A | * | 8/1988 | Luchinger | G01G 21/24 177/145 |
| 4,813,505 A | * | 3/1989 | Sodler | G01G 21/24 177/212 |
| 4,977,969 A | * | 12/1990 | Leisinger | G01G 23/012 177/50 |
| 5,340,951 A | * | 8/1994 | Hungerbuhler | G01G 21/244 177/210 EM |
| 5,844,174 A | | 12/1998 | Kuhlmann et al. | |
| 6,194,672 B1 | * | 2/2001 | Burkhard | G01G 21/244 177/210 EM |

(Continued)

FOREIGN PATENT DOCUMENTS

| | | |
|---|---|---|
| JP | 61-82118 A | 4/1986 |
| JP | 9-43043 A | 2/1997 |

*Primary Examiner* — Natalie Huls
(74) *Attorney, Agent, or Firm* — Standley Law Group LLP

(57) ABSTRACT

Eccentric loading errors of a weighing cell (1) with a parallel guiding mechanism are determined and corrected or at least reduced. The weighing cell has a test weight actuating device (14), by which at least one test weight (15) is positioned successively on at least three test weight support points (16, 17, 18, 19, 20) of the test load receiver (4) that do not lie in a straight line. A processor unit (21) uses a control signal (S1) to position the test weight on the support points. A test weighing signal (T) is generated for each support point, and from these, eccentric loading errors are ascertained. A device for correcting the eccentric loading errors uses control signals (S2) from the processor unit to make a geometrical-mechanical change in the parallel guiding mechanism, using a first and a second actuating unit.

14 Claims, 5 Drawing Sheets

(56) References Cited

U.S. PATENT DOCUMENTS

| | | | |
|---|---|---|---|
| 6,378,379 B1 * | 4/2002 | Emery | G01L 1/26 |
| | | | 73/856 |
| 6,557,391 B2 | 5/2003 | Lüchinger | |
| 6,603,081 B2 | 8/2003 | Lüchinger | |
| 6,835,901 B2 | 12/2004 | Lüchinger | |
| 7,345,249 B2 * | 3/2008 | Burkhard | G01G 21/244 |
| | | | 177/210 EM |
| 7,612,304 B2 * | 11/2009 | Kobayashi | G01G 21/244 |
| | | | 177/229 |
| 7,829,802 B2 | 11/2010 | Burkhard et al. | |
| 7,847,202 B2 | 12/2010 | Mueller et al. | |
| 7,851,713 B2 | 12/2010 | Burkhard et al. | |
| 8,153,913 B2 | 4/2012 | Haefeli et al. | |
| 8,383,965 B2 | 2/2013 | Erben et al. | |
| 8,766,113 B2 * | 7/2014 | Kusumoto | G01G 3/1412 |
| | | | 177/210 EM |
| 9,297,689 B2 * | 3/2016 | Beguin | G01G 3/1412 |
| 2005/0121237 A1 * | 6/2005 | Kusumoto | G01G 21/244 |
| | | | 177/229 |
| 2010/0044118 A1 * | 2/2010 | Burkhard | G01G 3/1412 |
| | | | 177/210 EM |
| 2013/0175098 A1 | 7/2013 | Béguin et al. | |
| 2013/0319072 A1 * | 12/2013 | Laubstein | G01G 23/012 |
| | | | 73/1.13 |

\* cited by examiner

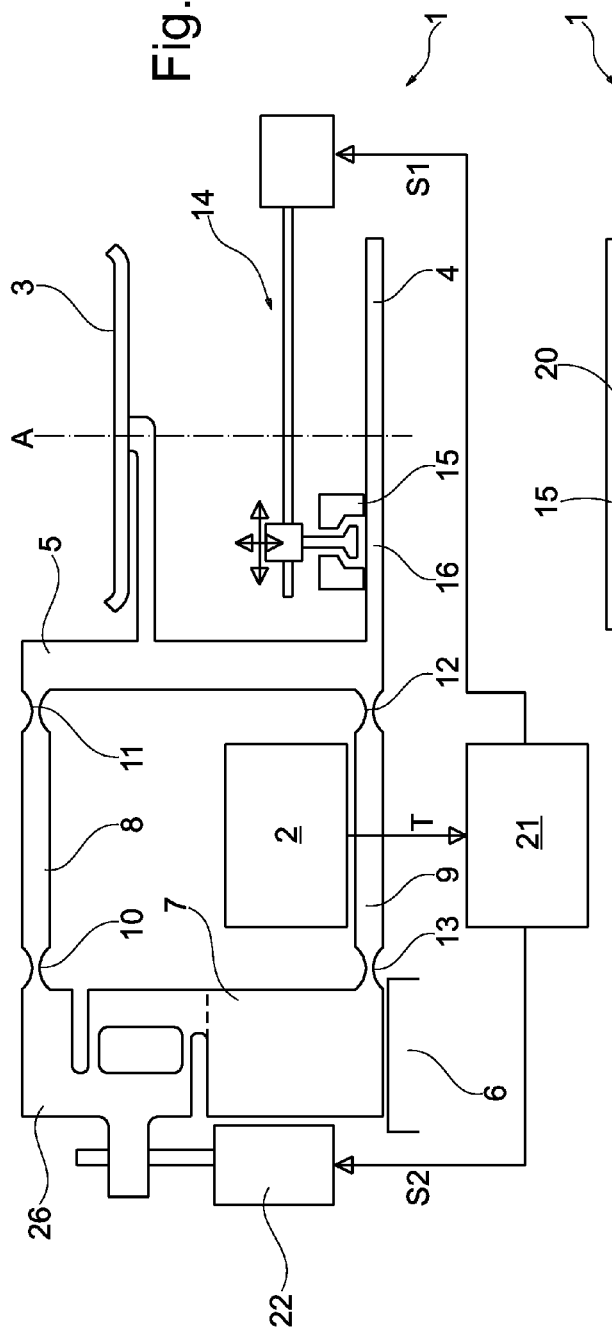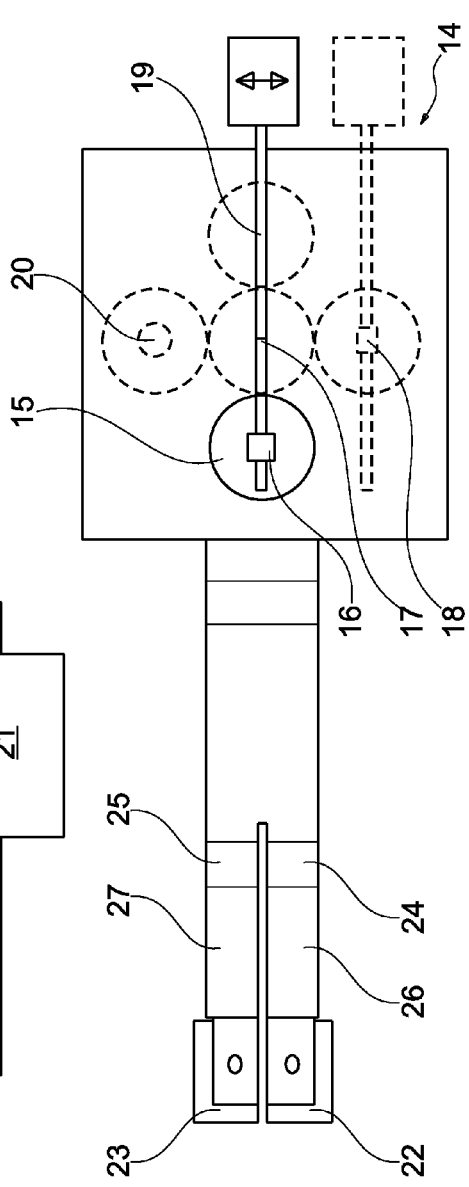

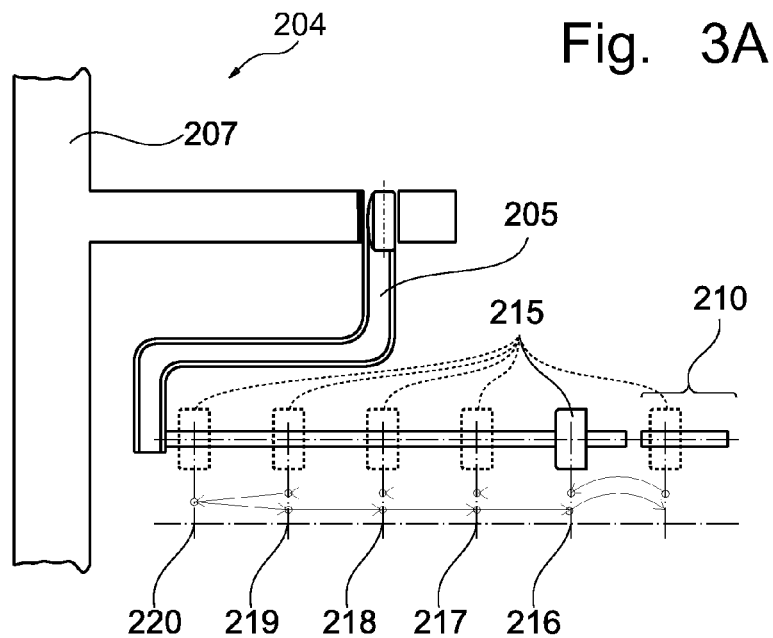
Fig. 3A
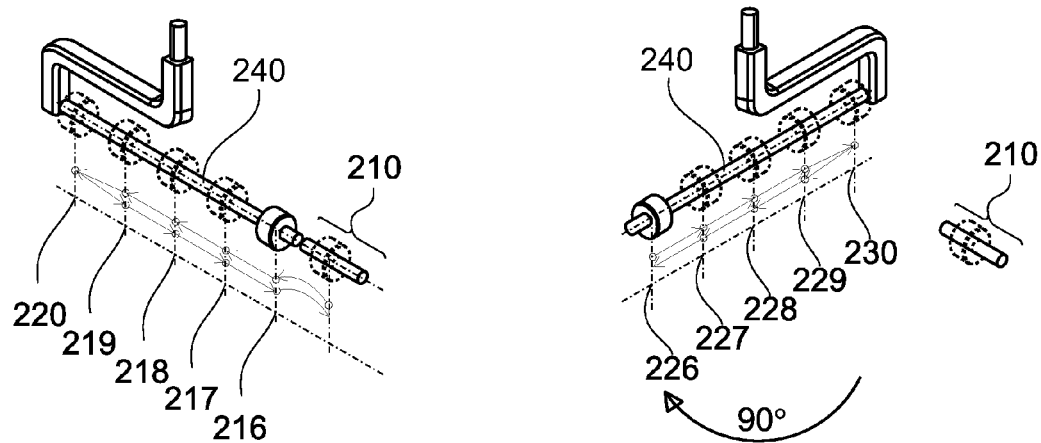
Fig. 3B
Fig. 3C

WEIGHING CELL WITH A DEVICE FOR CORRECTING ECCENTRIC LOADING ERRORS AND A METHOD FOR CORRECTING ECCENTRIC LOADING ERRORS

CROSS-REFERENCE TO RELATED APPLICATIONS

This application is entitled to benefit of a right of priority under 35 USC §119 from European patent application 13188141.9, filed on 10 Oct. 2013, the content of which is incorporated by reference as if fully recited herein.

TECHNICAL FIELD

The present invention relates to a weighing cell with a parallel guide, in particular a so-called parallel guiding mechanism, wherein a movable parallelogram leg carrying a weighing pan is guided by a first and a second parallel-guiding member on a stationary parallelogram leg. The parallelogram leg and the parallel-guiding members are connected to one another in an articulated manner, preferably by flexure-type bearings. The weighing pan carried by the movable parallelogram leg takes up the load to be weighed, the force whereof acting on the weighing pan is transmitted, if need be via a force transmission lever stepping down the force, to a measuring sensor. The parallel guide, the force transmission system and the measuring sensor essentially form the weighing cell of a gravimetric measuring instrument. Various functional principles of weighing cells are known in the prior art, such as for example weighing cells with strain gauges, weighing cells with cords, or EMFC (electromagnetic force compensation) weighing cells.

An essential feature of the weighing cells described above, which moreover is common to all scales with guided (as opposed to suspended) weighing pans, consists in the fact that the weight force transmitted by the weighing pan to the measuring sensor is generally slightly dependent on whether the weighing load is positioned centrally on the weighing pan or is displaced from the centre of the weighing pan towards the edge. This can have the undesired consequence that scales for one and the same weighing load display different weight amounts, depending on where the load to be weighed has been positioned on the weighing pan. These deviations in the case of eccentric positioning of the load to be weighed on the weighing pan are referred to as eccentric loading errors, in the technical jargon often also as corner load errors.

In the case of a parallel guiding mechanism in the sense described above, eccentric loading errors are for the most part caused by the fact that the parallel-guiding member deviate slightly from an ideal, absolute parallelism. The relative magnitude of the eccentric loading error, i.e. the observed weight deviation in relation to the magnitude of the test weight concerned and to its displacement from the centre of the weighing pan, roughly corresponds to the relative geometrical parallelism deviation causing the error. However, it must be pointed out that eccentric loading errors can be caused or at least influenced not only by geometrical parallelism deviations, but also by other factors, in particular by internal material stresses and their relaxation in the linkage points of the parallel guiding mechanism, since linkage points being constituted as elastic flexure-type bearings. The proportion of the eccentric loading error caused by these other factors, moreover, is in many cases not a linear function of the displacement of the test weight from the centre of the weighing pan.

A distinction is made between an eccentric loading error in the longitudinal direction and an eccentric loading error in the transverse direction of the parallel guiding mechanism, according to the displacement direction of the test weight on the weighing pan during testing of the scales with respect to eccentric loading errors. Various approaches are adopted in the present prior art to prevent a falsification of the weighing result due to eccentric loading errors, wherein the actually employed or proposed solutions can, roughly speaking, be split up into three groups A first solution consists in the fact that scales are equipped with means for detecting an eccentric loading error and, if required, for emitting a warning display or a warning signal. However, eccentric loading errors are not thereby prevented or corrected, but rather the user of the scales is merely informed about their presence and, if appropriate, their extent. Thus, for example, it is proposed in JP 61-082118 A that an automatic eccentric loading test is carried out on the scales when a temperature difference recorded by temperature sensors occurs between the stationary parallelogram leg and the movable parallelogram leg, motor-operated test weights installed in the scales being coupled eccentrically to the load receiver of the weighing cell and a warning display or a warning signal being triggered in the event of an eccentric loading error exceeding the tolerance. In a similar way, an installed automatic calibration mechanism with a plurality of eccentrically disposed calibration weights is used in JP 9-043043 A to check the eccentric loading behaviour of the scales in addition to the sensitivity and the linearity and, if required, to trigger a warning display or a warning signal.

A second approach to a solution consists in the fact that the current position of the centre of gravity of the material to be weighed on the weighing pan is determined in each weighing procedure by an arrangement of load sensors installed in the scales (e.g. in the form of strain gauges) and by associated signal processing means and that an eccentric loading correction assigned to the position of the centre of gravity concerned is taken into account in the weighing result to be displayed. This approach is taken in various modifications in DE 10 2006 031 950 B3, DE 10 2008 062 742 A1 and DE 196 32 709 C1.

A further example of a computational compensation of an eccentric loading error can be found in DE 10 2011 000 554 A1, wherein a weighing cell is described, in which a compact weighing pan is disposed on a load receiver in the form of a cantilever arm, which extends away from a load introduction point of the weighing cell in the longitudinal direction of the parallel guiding mechanism. As a result of the small size of the weighing pan compared to the length of the cantilever arm, an essentially constant eccentric position of the centre of gravity of the weighing load results. An adjustment mechanism is proposed, wherein at least two motor-operated adjustment weights are placed individually at different support points of an adjustment cantilever arm, which extends from the load introduction point in the opposite direction of the load-carrying cantilever arm. The eccentric loading error can be ascertained and compensated for computationally from the associated weighing results. However, this concept is limited in its applicability to load cells in which an eccentric position of the centre of gravity of the weighing load is essentially constant and previously specified in the longitudinal direction of the parallel guiding mechanism, as in the case described here.

As a third approach to a solution for preventing weighing errors caused by eccentric loading in a load cell with a parallel guiding mechanism, the conventional solution concept employed with the traditional Roberval parallel guiding mechanism continues to be predominant in the present prior art despite the possibilities of a computational compensation described above, wherein the eccentric loading errors present after the assembly procedure are corrected by mechanical adjustment, i.e. by small positional displacements, which are produced for example by means of adjusting screws or by plastic deformation.

On account of the considerable correlation described above between the eccentric loading errors and the geometry of the parallel guiding mechanism, an eccentric loading error in the longitudinal direction can be corrected by the fact that the mutual longitudinal alignment of the parallel-guiding member with respect to one another is changed in a suitable manner, whereby for example the flexure-type bearing of one of the two parallel-guiding member that is connected to the stationary parallelogram leg is displaced in the vertical direction by a small amount corresponding to the eccentric loading error to be corrected.

An eccentric loading error in the transverse direction, on the other hand, can be corrected by the fact that the mutual transverse alignment of the parallel-guiding member with respect to one another is changed in a suitable manner, whereby for example the flexure-type bearing of one of the two parallel-guiding member that is connected to the stationary parallelogram leg is rotated around the longitudinal axis of the guiding member by a small amount corresponding to the eccentric loading error to be corrected.

A parallel guiding mechanism, wherein the eccentric loading errors present after the assembly procedure can be corrected by an adjustment performed by plastic deformation, is described for example in U.S. Pat. No. 7,851,713 B2. By means of incisions on the stationary parallelogram leg, an adjustment region is formed which can be deformed plastically by using an adjustment tool and applying a suitable adjustment force, in such a way that the flexure-type bearing of the upper parallel-guiding member facing the stationary parallelogram leg can be both vertically displaced and also rotated relative to the longitudinal axis of the parallel-guiding member to the extent required for the error correction.

A variant of the same concept can be found in U.S. Pat. No. 8,153,913 B2, wherein the displacements required for the correction of the eccentric loading errors are produced however in an adjustment region of the stationary parallelogram leg by adjusting adjustment screws.

In US 2013/0175098, a correction of the eccentric loading errors in a parallel guiding mechanism is proposed, wherein a preliminary adjustment by plastic deformation is first performed with an adjustment tool and a fine adjustment then takes place by means of adjusting elements, e.g. in the form of adjustment screws.

A topological modification of the principle of the parallel guiding mechanism is described in U.S. Pat. No. 7,851,713 B2 cited above and in U.S. Pat. No. 7,829,802 B2, wherein the stationary parallelogram leg is constituted as a cylindrical tube, which surrounds the movable parallelogram leg concentrically, wherein the upper and lower parallel-guiding member are constituted as diaphragm springs. Here too, an adjustment region is formed in the stationary parallelogram leg by suitable incisions, said adjustment region being able to be shifted in its position by an adjustment tool and/or by adjustment screws.

In the case of the parallel guiding mechanisms considered in the preceding examples and also in the present invention, wherein eccentric loading errors are corrected by elastic or plastic deformation of one or more adjustment regions, it has been shown that an adjustment carried out for example after the assembly of the weighing cell does not produce a permanent absence of the existing eccentric loading errors. The effect of the relaxation of internal reaction forces and stresses, which are generated in the weighing cell during its assembly and adjustment, and of external influences such as vibrations and temperature changes, is that eccentric loading errors can also occur again at least to a smaller extent during subsequent use of the scale. In a regular inspection and readjustment of the scale, therefore, the eccentric loading behaviour, the so-called "corner load accuracy" of the scale, is usually checked in addition to the sensitivity and linearity and if need be readjusted.

In particular, scales of the highest accuracy class, usually referred to as analytical balances, are often equipped with so-called automatic calibration devices, with which at least the sensitivity and often also the linearity of the scales can be tested either fully automatically or by operating a push-button and if need be recalibrated. The question thus arises as to whether the eccentric loading errors could also be monitored and if need be readjusted with an automatically operating device. The periodic inspections by service technicians would then for the most part become unnecessary and the maintenance costs of the scales would thus be greatly reduced.

The problem of the invention, therefore, is to propose a weighing cell, wherein an eccentric loading error that may be present can be ascertained at the place of use and subsequently corrected without a service technician having to be brought in.

This problem is solved by a weighing cell with weighing electronics and with a parallel guiding mechanism, which comprises a movable parallelogram leg connected to a weighing load receiver and to a test load receiver and a stationary parallelogram leg connected to a supporting basic structure of the weighing cell as well as at least two parallel-guiding member, which connect the parallelogram legs by bearing points, wherein a vertical weighing load application axis is defined centrally with respect to the weighing load receiver. The weighing cell further comprises a test weight actuating device, with which at least one test weight can be positioned at at least three test weight support points of the test load receiver not lying on a straight line. A processor unit assigned to the weighing cell performs the functions of controlling the positioning of the at least one test weight on the test weight support points by means of a control signal and of subsequently receiving in each case a test weighing signal associated with the test weight support point concerned from the weighing electronics and of ascertaining eccentric loading errors of the weighing cell on the basis of the test weighing signals. The weighing cell is in particular provided with a device for correcting the eccentric loading errors, said device comprising at least a first and a second motor-operated actuating unit controlled by the processor unit, wherein a geometrical-mechanical change in the parallel guiding mechanism can be generated in each case by each actuating unit, as a result of which an eccentric loading error component assigned to this change and thus to this actuating unit can be corrected or at least reduced.

With this solution, therefore, a test cycle controlled by the processor unit is carried out, in which a test weight is positioned successively at a different test weight support points of the test load receiver and an associated test weight value is ascertained each time for each position of the test weight. If these test weight values differ from one another, the eccentric loading errors can be determined from the differences, on the basis of which the actuating units are then controlled to perform the required adjustment settings. If, on the other hand, the eccentric loading errors ascertained by the test cycle exceed a preset plausibility threshold, it can be concluded from this that there is a defect of the scales, usually damage to the parallel guide caused by mechanical shock or rough handling. The processor unit will expediently emit an error message in this case.

The fact that at least three test load support points not lying on a straight line are required arises due to the two-dimensional nature of the eccentric loading errors with mutually independent components in the longitudinal and transverse direction of the parallel guiding mechanism. In an obvious arrangement, three support points can for example be arranged in such a way that they define a right angle, wherein one leg of the right angle is orientated in the longitudinal direction and the other in the transverse direction of the parallel guiding mechanism. The adjustment settings of the eccentric loading errors in the longitudinal direction and in the transverse direction mutually influence one another in most cases, so that an adjustment of the error in the longitudinal direction causes a maladjustment in the transverse direction and conversely an adjustment of the error in the transverse direction causes a maladjustment in the longitudinal direction. The effect of this is that the correction cycle has to be iterated until such time as the eccentric loading errors lie within a preset tolerance.

The processor-controlled performance of the correction procedure has the advantage, amongst other things, that the mutual influencing of the adjustments in the longitudinal and transverse direction of the parallel guiding mechanism can be incorporated into the calculation of the adjustment settings to be performed, so that the eccentric loading errors can be corrected in a minimum number of iteration cycles below the preset tolerance and the correction procedure can thus be completed in the shortest possible time.

In a preferred embodiment of the weighing cell according to the invention, the test weight support points are located in a region containing the weighing load application axis and corresponding to the horizontal dimensions of the weighing load receiver. The test load device preferably comprises five test weight support points, i.e. a first test support point which is centred with the weighing load application axis, a second and a third test weight support point, which are displaced relative to the longitudinal direction of the parallel guiding mechanism from the first test support point to both sides in each case by the same distance, as well as a fourth and a fifth test weight support point, which are displaced relative to the transverse direction of the parallel guiding mechanism from the first test support point to both sides in each case by the same distance.

Advantageous embodiments are however also possible in which the test weight support points are located in a region lying outside the weighing load application axis. This relates in particular to a known design of weighing cells, wherein the weighing pan is carried by a cantilever arm, which projects laterally from the structural body of the weighing cell. The test load device can in this case be arranged, for example, above or below the parallel guiding mechanism in the interior of the structural body of the weighing cell. With such an arrangement of the test load receiver eccentric with respect to the weighing load application axis, however, the eccentric loading errors of the weighing cell are not directly represented by the measured deviations when the test weight is displaced into the test weight support points. According to the invention, therefore, provision is made in this case such that, following the original factory calibration of the eccentric loading errors, a measurement cycle is carried out with the test weight in the various test weight support points and such that the results or values derived therefrom are stored by the processor unit, in order that they can be used as reference values for the correction of the eccentric loading errors according to the invention when the scales are used subsequently.

If, in such a case, the test weight values differ from the stored values in the user's control panel, it is possible to determine from the differences in the test weight values and from the values stored in the memory of the processor unit the eccentric loading errors, on the basis of which the actuating units are then controlled to perform the required adjustment settings.

A possible temperature dependence of an eccentric loading error can also be determined as part of the factory calibration, during the recording of the parameters for the temperature compensation, and are taken into account during the correction of the eccentric loading errors in the user's control panel.

In a preferred embodiment, the at least one test weight is displaced horizontally sliding out of a parking position onto the test load receiver, is moved into the various test weight support points by a linear displacement on the test load receiver and a carousel-like rotation on the test load receiver, and is then displaced back into the parking position, wherein the test weight in the parking position is decoupled from the test load receiver and continuously loads the test load receiver on its displacement path and during the intermediate stops in the test weight support points.

In a further preferred embodiment, the at least one test weight is successively set down at different test weight support points by means of the test weight actuating device and between the latter is raised from the test load receiver.

In a likewise preferred embodiment, a plurality of test weights is present, there being assigned to each test support point a test weight with its own test weight actuating device, by means of which the test weight can be set down on the test support point and raised from the latter.

In the latter-mentioned embodiment, the device for correcting eccentric loading errors can at the same time perform the function of an automatic calibration device, wherein the sensitivity and, if appropriate, the linearity can be tested by placing on combinations of test weights and can if necessary be corrected.

In preferred embodiments of the weighing cell according to the invention, at least one of the parallel-guiding member is split up into two guiding member ends in the longitudinal direction in the region of the bearing point facing towards the stationary parallelogram leg, and there is assigned to each of the two guiding member ends an adjustment region with which the guiding member end concerned can be displaced in the vertical direction, wherein a first actuating unit is present for the vertical displacement of the first guiding member end and a second actuating unit for the vertical displacement of the second guiding member end.

As an alternative to the previously described embodiment, the stationary parallelogram leg can comprise an adjustment region, with which the guiding member end adjacent to the adjustment region can on the one hand be moved up and down in the vertical direction and on the other hand rotated around the longitudinal axis of the parallel guiding member concerned, wherein a first actuating unit is present for the vertical displacement and a second actuating unit for the rotation of the guiding member end adjacent to the adjustment region.

The actuating units are advantageously self-locking in each case, so that a set adjustment is retained after the current supply is shut off.

The weighing cell according to the invention with a device for correcting eccentric loading errors of a weighing cell with a parallel guiding mechanism can be used advantageously in analytical balances with a weighing capacity of 20 to 500 grams and with a digital display resolution of 0.001 to 0.1 milligrams and is also suitable in particular for scales according to the structural design described in EP 1 195 586 B1. The carrier of the material to be weighed, on a coupling arrangement extending through lead-throughs in the rear wall of the weighing chamber, is connected detachably to the movable parallelogram leg of the weighing cell and extends in a cantilever manner above the weighing chamber base from the weighing chamber rear wall into the weighing chamber. Disposed beneath the carrier of the material to be weighed is an installed calibration device, the calibration weight receiver whereof also extends in a cantilever manner from the movable parallelogram leg into the hollow space beneath the weighing chamber base.

In the scales described above according to EP 1 195 586 B1, the device according to the invention for correcting eccentric loading errors can be implemented in a particularly straightforward manner in that, on the one hand, the test load device in the form of a functional module for ascertaining the eccentric loading errors is disposed in the hollow space beneath the weighing chamber base in a similar manner to the calibration device shown in EP 1 195 586 B1 and that, on the other hand, the weighing cell is suitably equipped with the device for correcting the eccentric loading errors, said device comprising at least a first and a second motor-operated actuating unit controlled by the processor unit.

BRIEF DESCRIPTION OF THE DRAWINGS

Details of the weighing cell according to the invention with a device for correcting eccentric loading errors emerge with the aid of the description of the examples of embodiment represented in the drawings, where identical parts are identified with identical part numbers and wherein:

FIG. 1A shows a schematic representation of a weighing cell according to the invention, viewed from the side;

FIG. 1B shows a schematic representation of a weighing cell according to the invention, viewed from above;

FIG. 3A shows a view from the side of a further embodiment of a test load receiver;

FIG. 3B shows a three-dimensional view of the further embodiment of the test load receiver;

FIG. 3C shows a three-dimensional view of the further embodiment of a test load receiver, with the test load receiver rotated through 90°;

DETAILED DESCRIPTION

Figure 2A:
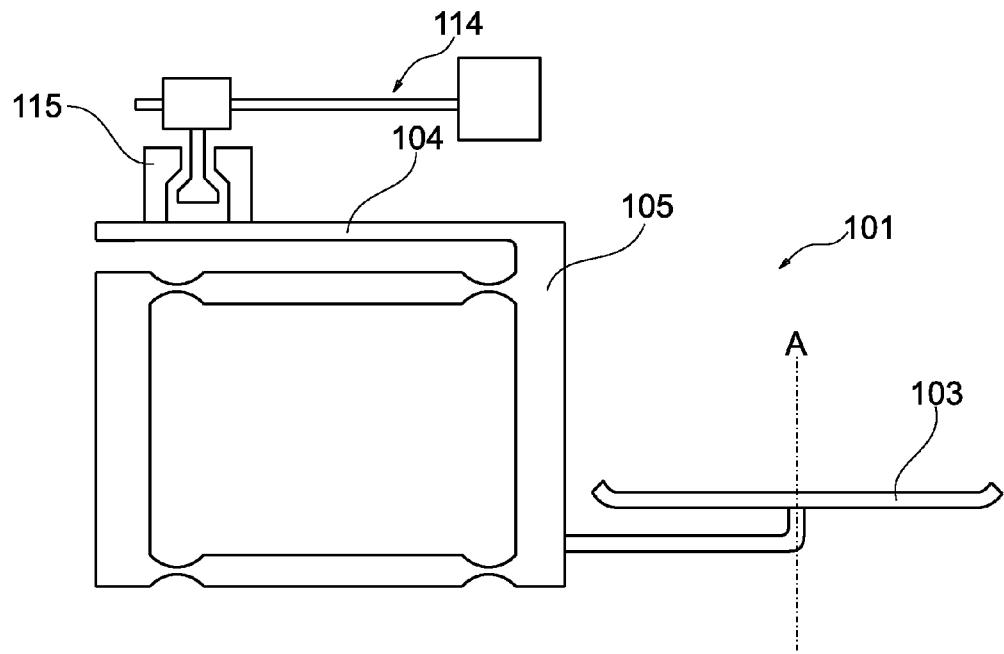
FIG. 2A shows a schematic representation of the weighing cell according to the invention in an alternative embodiment, viewed from the side.

Features with the same function and a similar embodiment are provided with the same reference numbers in the following description.

FIG. 1A and FIG. 1B show in a schematic representation—FIG. 1A from the side and FIG. 1B from above—a weighing cell 1 according to the invention with a parallel guiding mechanism and weighing electronics 2, wherein weighing electronics 2 are represented by a block symbol, which combines the weighing sensor based for example on the principle of magnetic force compensation and the associated signal processing and display functions. The parallel guiding mechanism comprises a movable parallelogram leg 5 connected to a weighing load receiver 3 and to a test load receiver 4 and a stationary parallelogram leg 7 connected to a supporting basic structure 6 of weighing cell 1 as well as at least two parallel-guiding member 8, 9, which connect parallelogram legs 5, 7 by means of flexure-type bearing points 10, 11, 12, 13, wherein a vertical weighing load application axis A is defined centrally with respect to weighing load receiver 2. Weighing cell 1 also comprises a test weight actuating device 14, by means of which at least one test weight 15 can be positioned successively at at least three test weight support points 16, 17, 18, 19, 20 of test load receiver 4, and a processor unit 21 with the functions of controlling the positioning of the at least one test weight 15 at test weight support points 16, 17, 18, 19, 20 by means of a control signal S1 and of subsequently receiving in each case a test weighing signal T associated with the test weight support point 16, 17, 18, 19, 20 concerned from the weighing electronics 2 and of ascertaining eccentric loading errors of weighing cell 1 on the basis of test weighing signals T. According to the invention, weighing cell 1 is provided with a device for correcting the eccentric loading errors, said device comprising at least a first and a second motor-operated actuating unit 22, 23 controlled by controls signals S2 of processor unit 21, by means of which a geometric-mechanical change in the parallel guiding mechanism assigned to respective actuating unit 22, 23 can be generated in each case, as a result of which an eccentric loading error component assigned to this change and therefore this actuating unit 22, 23 can be corrected or at least reduced.

In the embodiment of weighing cell 1 represented in FIG. 1A and FIG. 1B, test weight support points 16, 17, 18, 19, 20 are located inside a region containing weighing load application axis A and corresponding to the horizontal dimensions of weighing load receiver 3.

Test load receiver 4 in the example of FIG. 1A and FIG. 1B comprises five test weight support points 16, 17, 18, 19, 20, i.e. a first test support point 17, which is centred in weighing load application axis 12, a second and a third test weight application point 16, 19, which are displaced relative to the longitudinal direction of the parallel guiding mechanism from first test support point 17 to both sides in each case by the same distance, as well as a fourth and a fifth test weight support point 18, 20, which are displaced relative to the transverse direction of the parallel guiding mechanism from first test support point 17 to both sides in each case by the same distance. The arrangement of test weight support points 16, 17, 18, 19, 20 is particularly favourable for weighing cells with a parallel guiding mechanism, since the eccentric loading errors can be ascertained separately in the longitudinal and transverse direction. Other arrangements of test weight support points are however also possible. For example, four test weight support points could be arranged in each case in the corners of test load receiver 4 from FIG. 1A and FIG. 1B.

In FIG. 1A and FIG. 1B, it can also be seen that at least one of parallel-guiding member 8, 9 is split up in the longitudinal direction into two guiding member ends 24, 25 in the region of bearing point 10, 13 facing towards stationary parallelogram leg 7, wherein an adjustment region 26, 27 is assigned to each of the two guiding member ends 24, 25, by means of which adjustment region respective guiding member end 24, 25 can be displaced in the vertical direction. First actuating unit 22 is used for the vertical displacement of first guiding member end 24 and second actuating unit 23 is used for the vertical displacement of second guiding member end 25.

Figure 2B:
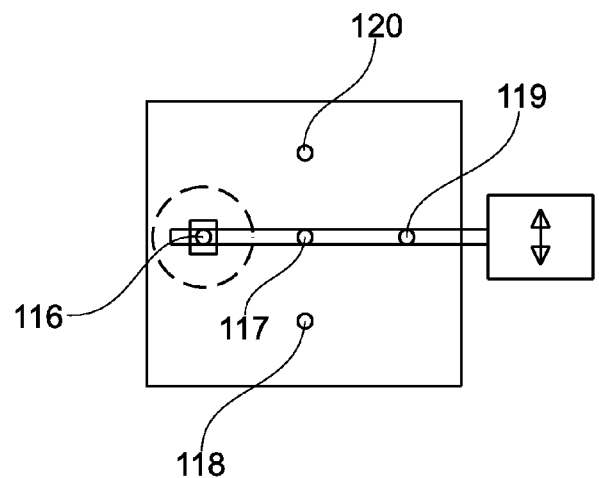
FIG. 2B shows a schematic representation of the weighing cell according to the invention in an alternative embodiment, viewed from above.

FIG. 2A shows a schematic representation of the weighing cell according to the invention in an alternative arrangement compared to FIG. 1A and FIG. 1B, viewed from the side, FIG. 2B viewed from above, wherein test load receiver 104 with test weight support points 116, 117, 118, 119, 120 does not lie concentrically with respect to load introduction axis A beneath weighing load receiver 103 projecting from movable parallelogram leg 107, but for example is disposed above the parallel guiding mechanism and eccentrically with respect to load introduction axis A. Weighing load receiver 103 can thus be positioned lower, which enables an ergonomically more favourable design of scales equipped with weighing cell 101. Further arrangements of test load receiver 104 eccentric with respect to load introduction axis A are also conceivable, for example beneath the parallel guiding mechanism or on the side facing away from weighing load receiver 103. With such an eccentric arrangement of test load receiver 104, however, the eccentric loading errors of the weighing cell are not directly represented by the measured deviations when test weight 115 is displaced into test load support points 116, 117, 118, 119, 120. The correlation between the measurement results and the actual eccentric loading errors is therefore expediently ascertained in the factory on the ready-assembled scales by means of a test cycle. Once the eccentric loading errors have been ascertained in the conventional manner by placing an external test load in various positions on weighing load receiver 103 and then corrected, the test weight actuating device installed in the scales is activated, by means of which the at least one test weight 115 is positioned at test weight support points 116, 117, 118, 119, 120 of test load receiver 104. The test weighing results assigned to the test weight support points for the calibrated scales or values derived therefrom are stored by the processor unit, in order that they can subsequently be used as reference values for the correction of the eccentric loading errors according to the invention when the scales are subsequently used.

FIG. 3A illustrates an alternative structural and functional design of a test load receiver 204 from the side. Further FIGS. 3B and 3C show a three-dimensional view of an alternative structural and functional design of test load receiver 204, wherein test load receiver 204 is rotated through 90° in FIG. 3C. The at least one test weight 215 is displaced horizontally in a sliding manner from a parking position 210 onto a test weight receiver rail 240, is moved by linear displacement on rail 240 and carousel-like rotation of test load receiver 204 through 90° from the position shown in FIG. 3a into the position shown in FIG. 3b into various test weight support points 216, 217, 218, 219, 220, 226, 227, 228, 229, 230 and is then displaced back into parking position 210, wherein test weight 215 in parking position 210 is decoupled from test load receiver 204 and continuously loads test receiver 204 on its displacement path and during the intermediate stops in test weight support points 216, 217, 218, 219, 220, 226, 227, 228, 229, 230.

In the embodiment of FIGS. 3A, 3B and 3C, wherein the test weight continuously loads test load receiver 204 on its displacement path and during the intermediate stops in test weight support points 216, 217, 218, 219, 220, 226, 227, 228, 229, 230, the important advantage arises that the transient phases, which occur in an electromagnetic compensation weighing cell with each load change, are for the most part no longer present, as a result of which the cycle time for the series of test weighing procedures at the test weight support points 216, 217, 218, 219, 220, 226, 227, 228, 229, 230 is decisively shortened.

Figure 4A:
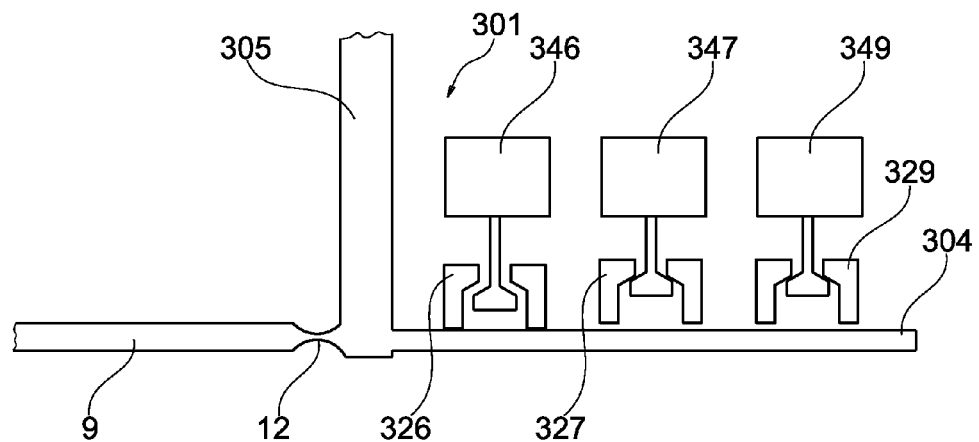
FIG. 4A shows a schematic cross-sectional representation along line A-A (see FIG. 4B) of the weighing cell according to the invention in a third embodiment, wherein an individual test weight actuating device is assigned to each test weight.
Figure 4B:
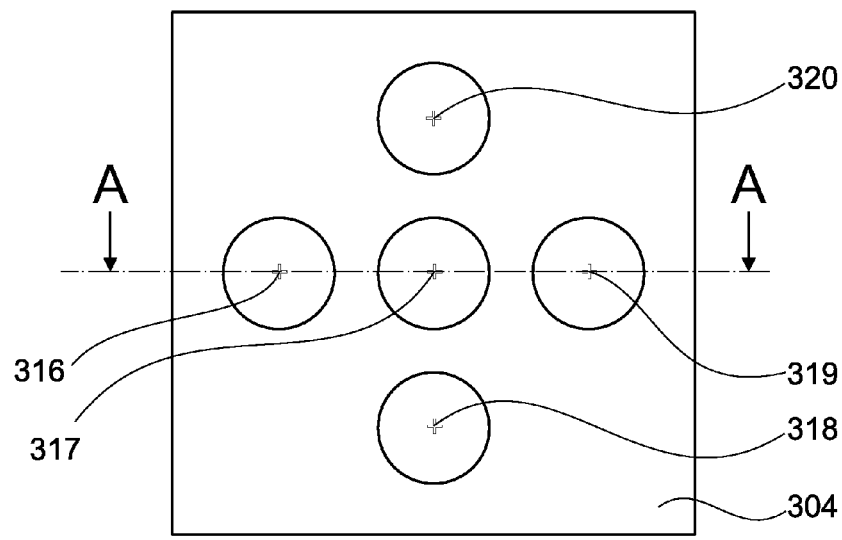
FIG. 4B shows a schematic representation of the weighing cell according to the invention in the third embodiment, wherein an individual test weight actuating device is assigned to each test weight, viewed from above.

FIG. 4A and FIG. 4B illustrate a further embodiment of the design according to the invention. FIG. 4A is a cross-sectional representation along line A-A from FIG. 4B. Instead of a single test weight, which is positioned successively at the various test weight support points, a plurality of test weights is present, there being assigned to each test weight support point 316, 317, 318, 319, 320 of test load receiver 304 a test weight 326, 327, 329 (test weights 328, 330 are not represented on account of the cross-sectional representation) with its own test weight actuating device 346, 347, 349 (test weight actuating devices 348, 350 are not represented due to the cross-sectional representation), by means of which test weight 326, 327, 329 can be set down on its assigned test weight support point 316, 317, 318, 319, 320 and can be raised therefrom.

It is particularly interesting with this embodiment that the arrangement of test weights 326, 327, 328, 329, 330, of test load receiver 304 with test weight support points 316, 317, 318, 319, 320 and of the test weight actuating devices 346, 347, 349 can simultaneously perform the function of an automatic calibration device known from the prior art, wherein the sensitivity and, if need be, the linearity is tested by placing on combinations of test weights 326, 327, 329 and, if necessary, corrected.

Figure 5:
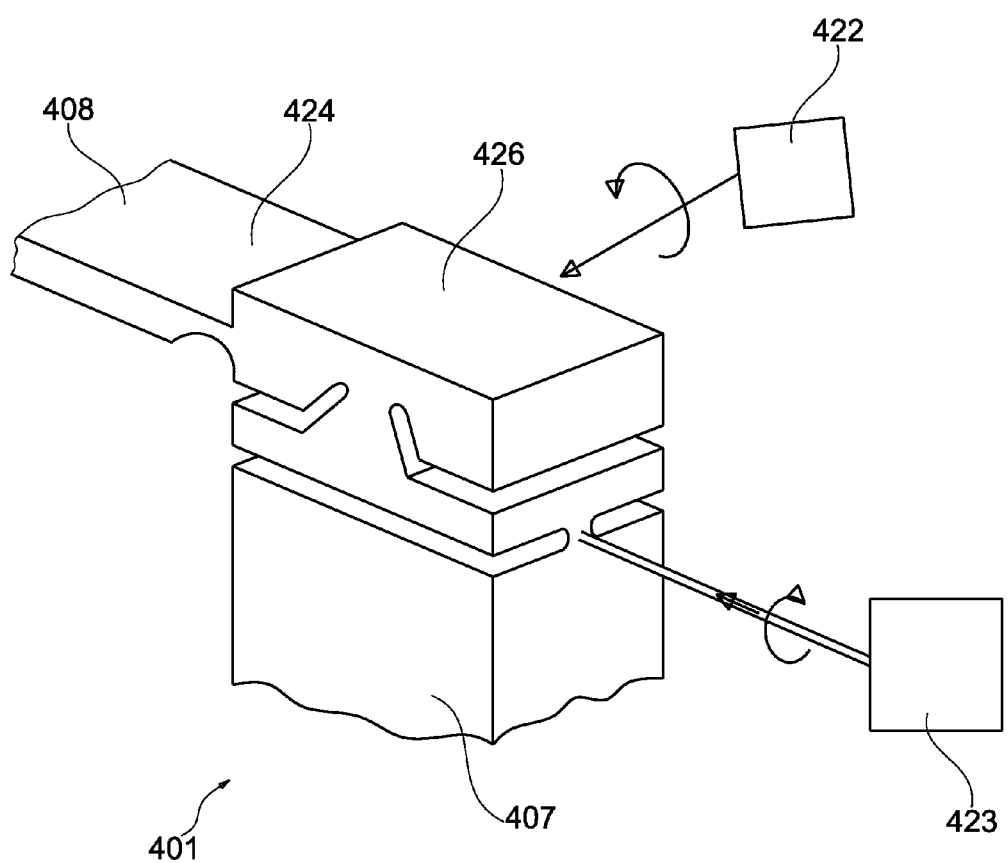
FIG. 5 shows an alternative embodiment of the adjustment region of the stationary parallelogram leg.

With regard to the correction of eccentric loading errors by geometric-mechanical changes of the parallel guiding mechanism, FIG. 5 shows a further possible embodiment, wherein stationary parallelogram leg 407 comprises an adjustment region 426, with which a guiding member end 424 adjacent to adjustment region 426 on the one hand can be moved up and down in the vertical direction and, on the other hand, can be rotated around the longitudinal axis of parallel guiding member 408, wherein a first actuating unit 422 is present for the vertical displacement and a second actuating unit 423 is present for the rotation of guiding member end 424 adjacent to adjustment region 426.

Although the invention has been described by the presentation of a number of specific examples of embodiment, it is obvious that numerous further variants of embodiment can be created in the knowledge of the present invention, for example by combining the features of the individual examples of embodiment with one another and/or by interchanging individual functional units of the examples of embodiment.

What is claimed is:
1. A cell for weighing a load on a weighing load receiver, the cell having weighing electronics associated therewith and a vertical load application axis, the cell comprising:

a parallel guiding mechanism which comprises:
- a movable parallelogram leg connected to the weighing load receiver;
- a test load receiver, connected to the movable parallelogram leg, the test load receiver having at least three test weight support points, not in a straight line;
- a stationary parallelogram leg, connected to a supporting basic structure; and
- at least two parallel-guiding members, which connect the parallelogram legs by bearing points;

a test weight actuating device, arranged to position at least one test weight successively at the at least three test weight support points, wherein:
- the test weight actuating device displaces the at least one test weight horizontally in a sliding manner from a parking position onto the test load receiver;
- the test load receiver moves the at least one test weight into the at least three test weight support points along a linear displacement path on the test load receiver and by carousel-like rotation of the test load receiver, the at least one test weight continuously loading the test load receiver on the displacement path and during the intermediate stops in the test weight support points; and
- the test weight actuating device displaces the at least one test weight back into the parking position, where the at least one test weight is decoupled from test load receiver;

a processor unit, configured for generating control signals for the test weight actuating device, to control the positioning of the at least one test weight on the test weight support points and to receive, from the weighing electronics, a test weighing signal associated with each test weight support point concerned and also configured to ascertain eccentric loading errors of the weighing cell on the basis of the received test weighing signals, and a device for acting upon the ascertained eccentric loading errors, comprising at least a first and a second motor-operated actuating unit controlled by additional control signals from the processor unit, to generate a geometrical-mechanical change in the parallel guiding mechanism assigned to the actuating unit concerned, the geometrical-mechanical change associated with an eccentric loading error component, thereby correcting or at least reducing the eccentric loading errors.

2. The cell of claim 1, wherein:
each of the at least three test weight support points is located inside a region that contains the vertical weighing load application axis and that corresponds to the horizontal dimensions of the weighing load receiver.

3. The cell of claim 2, wherein:
the test load receiver has five test weight support points, defined as follows:
- a first test support point, centered in the vertical weighing load application axis;
- a second and a third test weight support point, each of which is displaced by the same distance relative to the longitudinal direction of the parallel guiding mechanism from the first test weight support point, the second and third test weight support points on opposite sides of the first test weight support point; and
- a fourth and a fifth test weight support point, each of which is displaced by the same distance relative to the transverse direction of the parallel guiding mechanism from the first test weight support point, the fourth and fifth test weight support points on opposite sides of the first test weight support point.

4. The cell of claim 1, wherein:
the test load receiver with the at least three test weight support points is located in a region that lies outside the vertical weighing application load axis defined centrally with respect to the weighing load receiver.

5. The cell of claim 1, wherein:
the test weight actuating device sets down the at least one test weight successively at different test weight support points of the test load receiver, the at least one test weight being decoupled or raised from the test load receiver during the movement between the test weight support points.

6. The cell of claim 1, further comprising:
for each test weight support point, a test weight system comprising:
- a test weight assigned to the test weight support point; and
- a test weight actuating device corresponding to the test weight, the actuating device arranged for setting the assigned test weight down on and raising the assigned test weight up from the test support point.

7. The cell of claim 6, wherein:
each test weight system is arranged to simultaneously perform an automatic calibration function in which the sensitivity and, optionally, the linearity of the weighing cell is tested by placing combinations of test weights on the test weight support points and, if necessary, is corrected.

8. The cell of claim 1, wherein:
the arrangement of the test weights, the test weight load receiver with the test weight support points and the actuating devices is constituted as a modular unit that is removable from the weighing cell.

9. The cell of claim 1, wherein:
- at least one of the parallel-guiding members is split up into two guiding member ends in the longitudinal direction in the region of the bearing point facing towards the stationary parallelogram leg, with each of the two guiding member ends having an adjustment region;
- the first actuating unit is arranged for vertically displacing the first guiding member end; and
- the second actuating unit is arranged for vertically displacing the second guiding member end.

10. A method for correcting eccentric loading errors in a cell for weighing a load on a weighing load receiver, the cell having weighing electronics associated therewith and a vertical load application axis, the cell further having a parallel guiding mechanism with a movable parallelogram leg connected to the weighing load receiver, a test load receiver, connected to the movable parallelogram leg, the test load receiver having at least three test weight support points, not in a straight line; a stationary parallelogram leg, connected to a supporting basic structure; and at least two parallel-guiding members, which connect the parallelogram legs by bearing points; a test weight actuating device, arranged to position at least one test weight successively at the at least three test weight support points; a processor unit, configured for generating control signals for the test weight actuating device, to control the positioning of the at least one test weight on the test weight support points and to receive, from the weighing electronics, a test weighing signal associated with each test weight support point concerned and also configured to ascertain eccentric loading errors of the weighing cell on the basis of the received test weighing signals, and a device for acting upon the ascertained eccentric loading errors, comprising at least a first and a second motor-operated actuating unit controlled by additional control signals from the processor unit, to generate a geometrical-mechanical change in the parallel guiding mechanism assigned to the actuating unit concerned, the geometrical-mechanical change associated with an eccentric loading error component, thereby correcting or at least reducing the eccentric loading errors, the method comprising the steps of:

successively coupling at least one test weight at the different test weight support points of the test load receiver;

ascertaining, from the coupling step, an associated test weight value for each position of the test weight;

determining the eccentric loading errors using the ascertained test weight values;

calculating corresponding adjustment settings based upon the determined eccentric loading errors; and performing the calculated adjustment settings with the first and second actuating units using control signals from the processor unit, and repeating the steps until the eccentric loading errors lie within a predetermined tolerance.

11. The method of claim 10, wherein:
an initial set of reference values for the correction of the eccentric loading errors are ascertained by the steps of:
placing an external test load in various positions on the weighing load receiver,
correcting the eccentric loading errors;
carrying out a measurement cycle with the test weight in various test weight support points of the test load receiver;
assigning weighing results, or values derived therefrom, to the test weight support points; and
storing the weighing results or values derived therefrom in the processor unit for subsequent use.

12. The method of claim 10, wherein:
the eccentric loading errors are determined from the differences in the test weight values and from the values stored in the memory of the processor unit; and
control signals are sent to the actuating units to perform the required adjustment settings.

13. The method of claim 10, further comprising the step of:
determining a possible temperature dependence of an eccentric loading error as a as part of the initial set of reference value; and
taking the temperature dependence into account during the correction of the eccentric loading errors.

14. The method of claim 10, comprising the steps of:
coupling the test weights in at least one combination with one another on the test load receiver;
determining the test weighing values associated with the combinations of coupled test weights; and
correcting the sensitivity and, optionally, the linearity of the weighing cell, if the test weighing values diverge from a set of stored calibration values in the processor unit by more than a predetermined amount.

* * * * *

UNITED STATES PATENT AND TRADEMARK OFFICE
CERTIFICATE OF CORRECTION

PATENT NO. : 9,612,149 B2
APPLICATION NO. : 14/511384
DATED : April 4, 2017
INVENTOR(S) : Hans-Rudolf Burkhard Page 1 of 1

It is certified that error appears in the above-identified patent and that said Letters Patent is hereby corrected as shown below:

In Column 14, Line 17, please delete "error as a as part" and insert -- error as a part --.

Signed and Sealed this
Twenty-third Day of May, 2017

Michelle K. Lee
*Director of the United States Patent and Trademark Office*